United States Patent
Kim et al.

(10) Patent No.: US 8,616,536 B2
(45) Date of Patent: Dec. 31, 2013

(54) ACTIVE DYNAMIC VIBRATION ABSORBER APPARATUS FOR VEHICLE

(75) Inventors: Jae-San Kim, Gyunggi-Do (KR);
Jeong-Hoon Kim, Gyunggi-Do (KR);
Un-Hwan Park, Gyunggi-Do (KR);
Yoon-Chul Song, Gyunggi-Do (KR);
Sang-Heun Oh, Gyunggi-Do (KR)

(73) Assignees: Hyundai Motor Company, Seoul (KR);
Pavco Co., Ltd., Daegu-Shi (KR)

( * ) Notice: Subject to any disclaimer, the term of this patent is extended or adjusted under 35 U.S.C. 154(b) by 245 days.

(21) Appl. No.: 12/953,298

(22) Filed: Nov. 23, 2010

(65) Prior Publication Data
US 2011/0316206 A1   Dec. 29, 2011

(30) Foreign Application Priority Data
Jun. 23, 2010 (KR) .................. 10-2010-0059359

(51) Int. Cl.
*F16M 5/00* (2006.01)

(52) U.S. Cl.
USPC .................. 267/140.14; 267/140.15; 188/267; 188/380

(58) Field of Classification Search
USPC ............... 267/140.14, 140.15, 160, 161, 163; 188/267, 379, 380
See application file for complete search history.

(56) References Cited

U.S. PATENT DOCUMENTS

| | | | | |
|---|---|---|---|---|
| 2,748,370 A | * | 5/1956 | Baltosser | 267/160 |
| 3,344,397 A | * | 9/1967 | Elliott et al. | 267/160 |
| 5,427,362 A | * | 6/1995 | Schilling et al. | 188/379 |
| 6,565,072 B2 | * | 5/2003 | Goto et al. | 267/140.14 |
| 2008/0060894 A1 | * | 3/2008 | Koyama et al. | 188/379 |
| 2009/0079114 A1 | * | 3/2009 | Muraoka | 267/140.14 |
| 2011/0316363 A1 | * | 12/2011 | Kim | 310/28 |

FOREIGN PATENT DOCUMENTS

| | | |
|---|---|---|
| JP | 59-183138 A | 10/1984 |
| JP | 5-231469 A | 9/1993 |
| JP | 10-246283 A | 9/1998 |
| JP | 2010-14174 A | 1/2010 |

* cited by examiner

*Primary Examiner* — Thomas J Williams
(74) *Attorney, Agent, or Firm* — Morgan, Lewis & Bockius LLP

(57) ABSTRACT

An active dynamic vibration absorber apparatus for a vehicle that may be mounted to a frame of the vehicle and vibrates when power may be supplied to attenuate vibration of the vehicle, may include a housing, an upper spring and a lower spring, and a yoke assembly disposed between the upper spring and the lower spring which may be plates arranged in parallel, and selectively vibrates up/down in the housing, wherein the yoke assembly has an upper protrusion and a lower protrusion that protrude from the top and the bottom thereof, respectively, the upper protrusion being fastened to the center of the upper spring through the housing, and the lower protrusion being fastened to the center of the lower spring in the housing.

2 Claims, 4 Drawing Sheets

ACTIVE DYNAMIC VIBRATION ABSORBER APPARATUS FOR VEHICLE

CROSS-REFERENCE TO RELATED APPLICATION

The present application claims priority to Korean Patent Application No. 10-2010-0059359, filed on Jun. 23, 2010, the entire contents of which is incorporated herein for all purposes by this reference.

BACKGROUND OF THE INVENTION

1. Field of the Invention

The present invention relates to an active dynamic vibration absorber apparatus for a vehicle, and more particularly, to an active dynamic vibration absorber apparatus for a vehicle of which the number of parts is reduced by simplifying the structure and the performance is improved.

2. Description of Related Art

Researches and studies have been conducted to attenuate vibration, because the vibration is generated in vehicles due to operation of the engine.

Dynamic vibration absorbers are devices reducing the amplitude of vibration by intentionally producing anti-node against generated vibration and have been widely used as device for attenuating vibration of vehicles.

The dynamic vibration absorbers make a mass-spring system, and in the dynamic vibration absorbers, a device that senses generated vibration and attenuates the vibration by adjusting the amplitude and cycle in accordance with the amplitude and frequency is called an active dynamic vibration absorber. The active dynamic vibration absorber includes a dynamic vibration absorber, which is a mass-spring system, and a sensor and a unit which can reciprocate the vibration absorber, using electrical energy.

Referring to FIG. 1A, vibration of an engine is transmitted to a chassis through an engine mount, such that the entire vehicle body is vibrated. Although the vibration is attenuated at a predetermined level across the engine mount, it is not satisfactory. Therefore, an active dynamic vibration absorber apparatus is additionally installed to attenuate the vibration that is transmitted from the engine.

As shown in the figure, the active vibration absorber apparatus includes, in addition to a vibration absorber, an accelerometer that senses the magnitude and direction of vibration of the chassis, a controller that senses the RPM of the engine and controls the vibration absorber in response to a signal from the accelerometer, and an amplifier that amplifies an electrical signal transmitted from the controller.

As shown at the right in the figure, the active dynamic vibration absorber apparatus having this configuration has an effect of attenuating the vibration from the chassis by controlling the vibration absorber to generate vibration having a phase opposite to the vibration that is generated from the engine and transmitted through the engine mount.

Since the active dynamic vibration absorber apparatus having the configuration can generate vibration having the inverse phase by controlling electric signals in accordance with vibration differently generated in accordance with the RPM of the engine, it is possible to more effectively control the vibration of the engine even in high-speed and low-speed traveling of the vehicle.

In an active dynamic vibration absorber apparatus, a vibration absorber that includes a coil unit wound therein to vibrate in response to an electric signal and a yoke assembly moved by electric force, when electricity flows to coils, and having predetermined mass therein. The yoke assembly is moved in different directions by force that is continuously applied and leaf springs are fastened to the top and the bottom of the yoke assembly to convert the movement into vibration.

FIG. 1B is a view showing a vibration absorber of the related art, in which leaf springs 2a, 2b are attached to a yoke assembly 3. Referring to FIG. 1B, a plurality of arc-shape leaf springs is attached to the edges of the top and the bottom of the yoke assembly and has bolts and nuts at the ends to be fastened to a housing. However, the positions where the leaf springs are fastened to the yoke assembly are generated as much as the number of the leaf springs in this structure, and it is required to more efficiently calculate inertial force of the yoke assembly that vibrates, because the inertial force disperses to the leaf springs.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a dynamic vibration absorber that can more effectively generate vibration of a yoke assembly.

In an aspect of the present invention, the active dynamic vibration absorber apparatus for a vehicle that may be mounted to a frame of the vehicle and vibrates when power may be supplied to attenuate vibration of the vehicle, may include a housing, an upper spring and a lower spring, and a yoke assembly disposed between the upper spring and the lower spring which may be plates arranged in parallel, and selectively vibrates up/down in the housing, wherein the yoke assembly may have an upper protrusion and a lower protrusion that protrude from the top and the bottom thereof, respectively, the upper protrusion being fastened to the center of the upper spring through the housing, and the lower protrusion being fastened to the center of the lower spring in the housing.

The lower spring and the upper spring each may have two or more spokes radially extending from the center, and ends of the spokes may be fastened to the housing, wherein the spokes may be spirally formed.

The yoke assembly may include a lower yoke having a cup shape and opening in the top thereof and the lower protrusion formed on the bottom of the lower yoke, a magnetic substance fastened to upper surface of the lower yoke, and an upper yoke fastened to the top of the magnetic substance and having the upper protrusion on the top thereof, and an insertion space defined between an inner circumference of the lower yoke and outer circumferences of the upper yoke and the magnetic substance, and a coil unit disposed in the insertion space and wound with a coil, wherein an upper portion of the coil unit may be fixed to the housing.

A connection ring connecting the upper yoke with the lower yoke may be fitted on the outer circumference of the magnetic substance and a portion of the upper and lower yokes.

According to the exemplary embodiment of the present invention having this configuration, since the yoke assembly is fastened only to the center of leaf springs, such that it can more efficiently vibrate up/down. Further, it is possible to increase weight by increasing volume of the yoke assembly in the same housing, such that it is possible to increase excitation force.

Furthermore, it is possible to facilitate assembling and reduce the manufacturing cost, by integrally forming an upper spring and a lower spring, without using a plurality of parts.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1A:
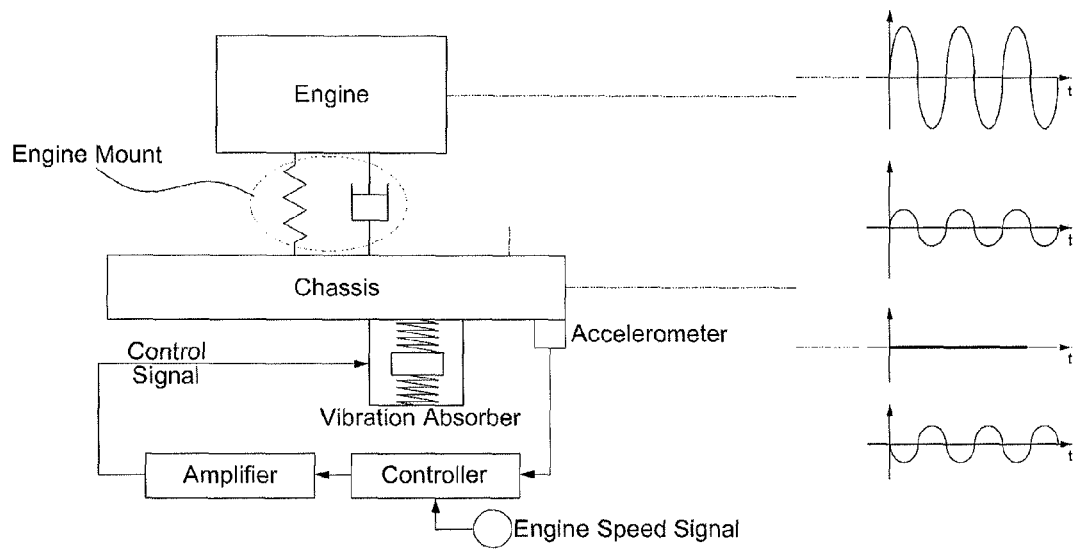
FIG. 1A is a diagram illustrating the configuration of an active dynamic vibration absorber apparatus installed in a vehicle.
Figure 1B:
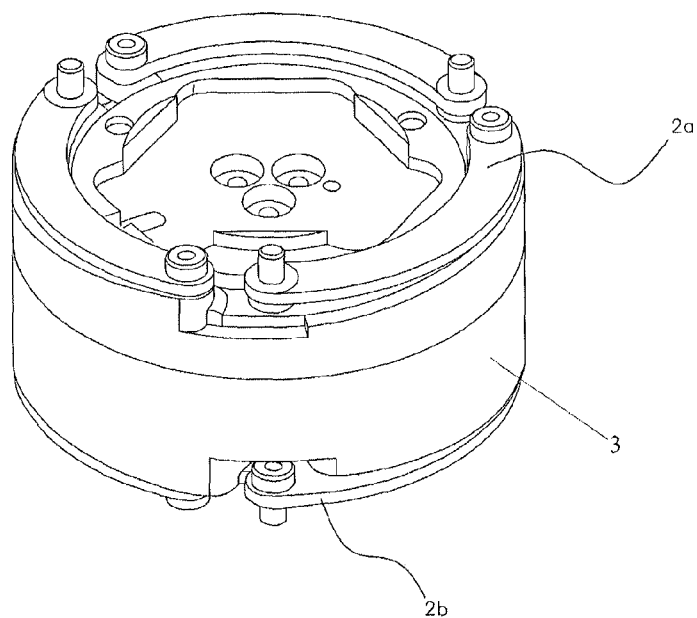
FIG. 1B is a view showing a vibration absorber of the related art, in which leaf springs are attached to a yoke assembly.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The structure of a dynamic vibration absorber 100 in an active dynamic vibration absorber apparatus according to an exemplary embodiment of the present invention is described hereafter in detail with reference to the accompanying drawings.

Figure 2:
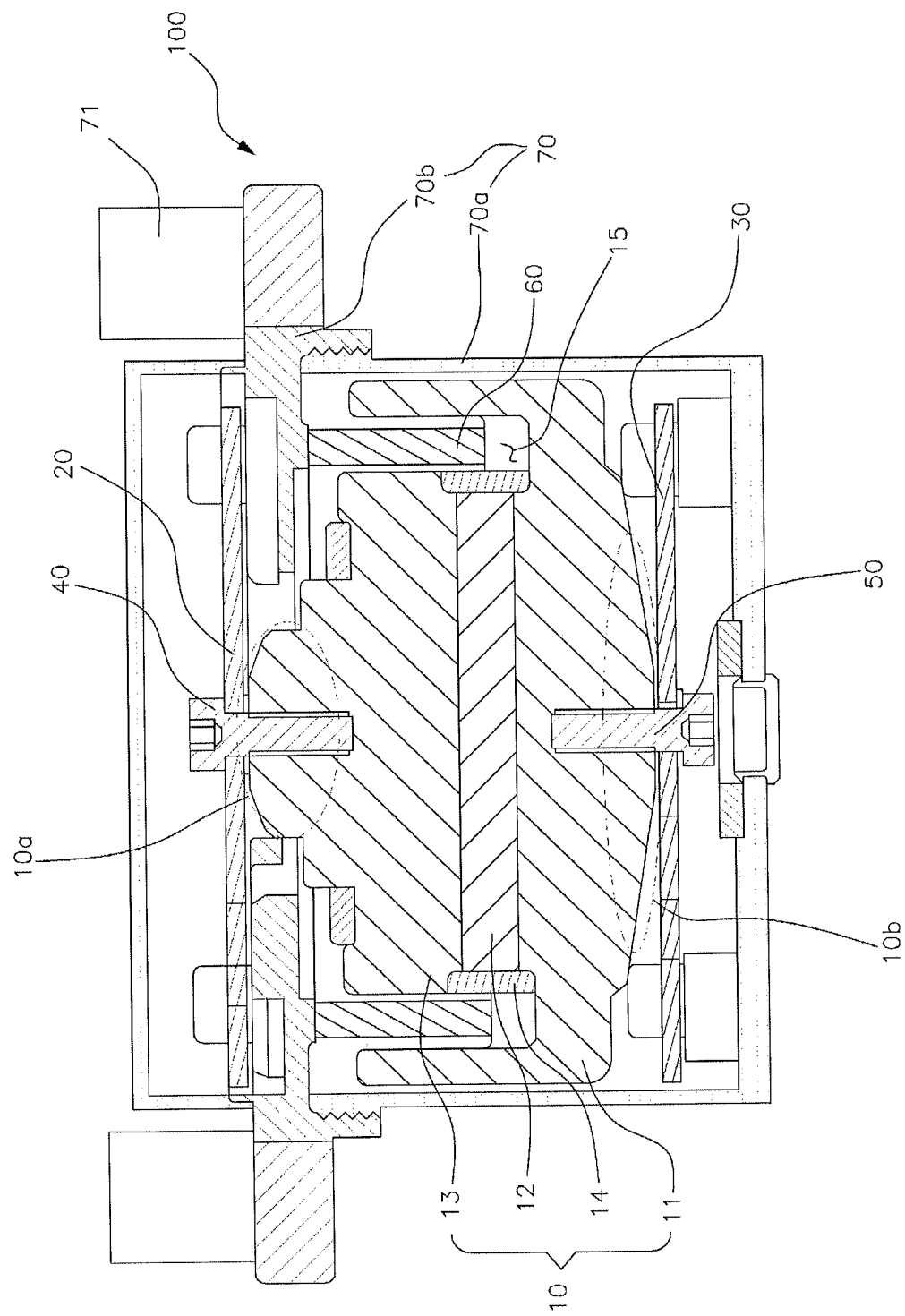
FIG. 2 is a cross-sectional view of a vibration absorber according to an exemplary embodiment of the present invention.
Figure 3:
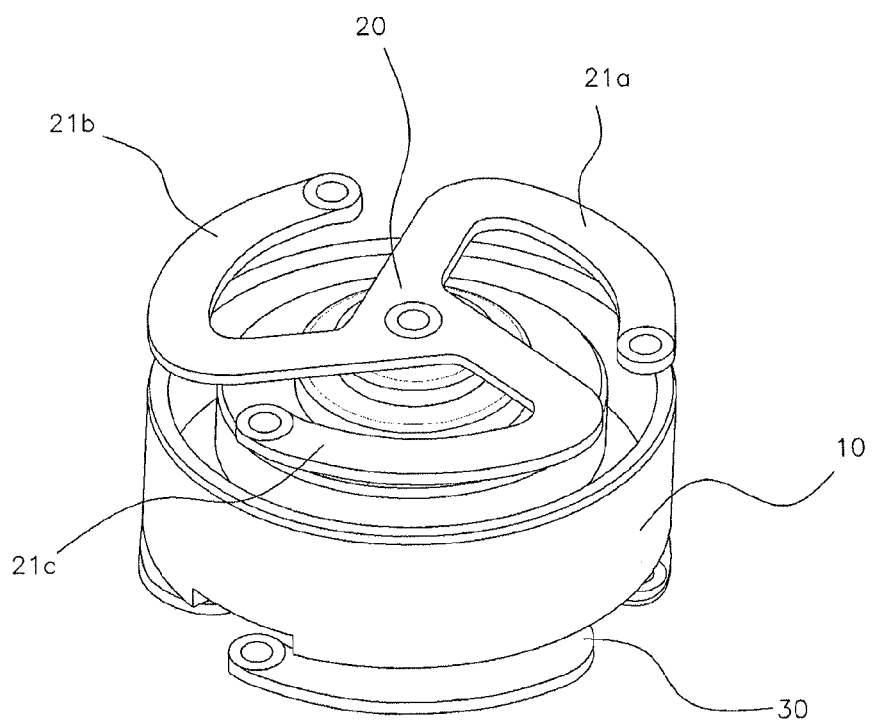
FIG. 3 is a perspective view showing when a lower spring and an upper spring are mounted to the yoke assembly according to an exemplary embodiment of the present invention.

Referring to FIGS. 2 and 3, the dynamic vibration absorber 100 according to an exemplary embodiment of the present invention is mounted on a chassis or a subframe of a vehicle and vibrates in response to an electric signal from a controller and an amplifier, as described above.

The dynamic vibration absorber 100 includes a housing 70 accommodating a yoke assembly 10, a coil unit 60, a lower spring 30, and an upper spring 20.

The housing 70 includes a lower housing 70a formed in a cup shape and an upper housing 70b equipped with a bracket 71 at the top to be fastened to a subframe while opening/closing the top of the lower housing 70a.

The upper housing 70b has a hole at the center such that the upper end of the yoke assembly 10 protrudes, and the coil unit 60 wound with a coil is fixed to the bottom of the upper housing 70b. The coil unit 60 is provided with an electric wire to be an electromagnet by current supplied from the outside and has a cylindrical shape with the top and bottom open such that a magnetic substance 12 and an upper yoke 13 are disposed therein.

Meanwhile, the lower spring 30 is positioned at a predetermined height from the bottom (in consideration of vibration of the yoke assembly) and the yoke assembly 10 is disposed on the lower spring 30 in the lower housing 70a.

The yoke assembly 10 is formed by stacking the lower yoke 11, the magnetic substance 12, and the upper yoke 13. The lower yoke 11 is formed in a cup shape with the top depressed, and has a lower protrusion 10b that protrudes downward in a convex shape. A bolt hole is formed at the center of the lower protrusion 10b and a bolt 50 is inserted in the bolt hole after the lower yoke 11 is disposed on the lower spring 30.

The magnetic substance 12 that is a cylindrical or a ring-shaped permanent magnet is seated in the lower yoke 11. The upper yoke 13 is seated on the magnetic substance 12. The upper yoke 13 is also formed in a cylindrical shape and has an upper protrusion 10a at the top, which protrudes upward through the hole of the upper housing 70b. The upper yoke 13 and the magnetic substance 12 are fixed to the lower yoke 11 by a connection ring 14.

Further, an insertion space 15 that is spaced apart from the upper yoke 13 and the magnetic substance 12 is defined in the lower yoke 11. The coil unit 60 is inserted into the insertion space 15, when the lower housing 70a and the upper housing 70b are combined. The upper spring 20 is seated on the upper protrusion 10a, which protrudes through the hole of the upper housing 70b, of the upper yoke 13. Similar to the lower yoke 11, the upper spring 20 is fastened to the upper yoke 13 by a bolt 40 and is also fastened to the upper housing 70b at the edge.

On the other hand, as shown in FIG. 3, it is preferable that the upper spring 20 has a pinwheel shape. That is, the center portion of the upper spring 20 is a plate having a predetermined area and has a bolt hole to be fastened by a bolt, and three spokes 21a, 21b, and 21c radially extend from the center portion. The spokes 21a, 21b, and 21c each have a hole at the end to be fastened to the upper housing 70b by a bolt and are spirally formed in order not to interfere with vibration of the yoke assembly, and support the yoke assembly and maintain the position of the yoke assembly. Meanwhile, though not shown clearly in the drawings, the lower spring 30 are also formed in the same configuration as the upper spring 20.

Figure 4:
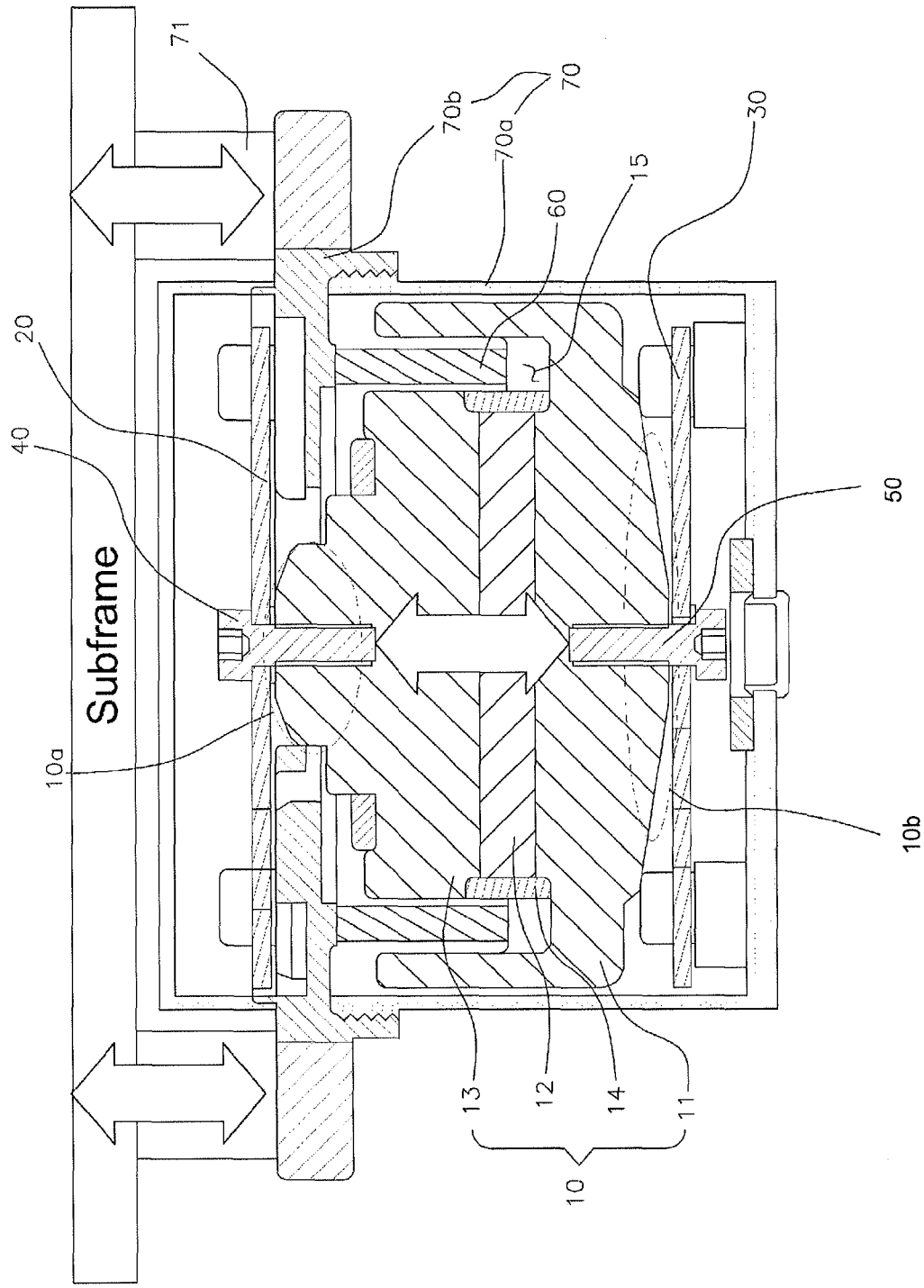
FIG. 4 is a cross-sectional view showing when the dynamic vibration absorber according to an exemplary embodiment of the present invention is mounted to a subframe and generates vibration.

The dynamic vibration absorber having the above configuration is mounted to a chassis or a subframe of a car body to vibrate, as shown in FIG. 4, when power is supplied from a controller and an amplifier, as described above.

Vibration of the dynamic vibration absorber that is in area contact with the subframe by the bracket 71 is generated as follows. Since the upper yoke 13 and the lower yoke 11 were magnetized by the magnetic substance 12, a magnetic field is generated around the yoke assembly 10. Further, another magnetic field is generated around the coil unit 60 by applying current. In this configuration, the entire yoke assembly 60 is moved by the Lorentz force in the direction of the force in accordance with the direction of current flowing through the coil unit, therefore, driving force that vibrates the yoke assembly 60 is generated by continuously changing the phase of the current flowing through the coil unit The Lorentz force is proportionate to the wound number of coil, magnetic flux density, the length of the leading wire, and the magnitude of current, therefore, it is possible to control the vibration of the dynamic vibration absorber by controlling the magnitude of the current with the controller.

Meanwhile, the driving force according to change in the magnetic field is $$F_m = m\ddot{x} + c\dot{x} + kx$$

(m: mass of moving mass, x: displacement of moving mass, c: attenuation coefficient of spring, k: elastic coefficient of spring). As the moving mass (the entire mass when the upper yoke, magnetic substance, and lower yoke are in motion) is moved by the driving force, the inertial force of the moving mass is transmitted to the subframe and offsets the engine excitation force. In this operation, the transmitted force substantially attenuating the sub-frame is calculated from $F_T = m\ddot{x}$.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active dynamic vibration absorber apparatus for a vehicle that is mounted to a frame of the vehicle and vibrates when power is supplied to attenuate vibration of the vehicle, the active dynamic vibration absorber apparatus comprising:
    a housing;
    an upper spring and a lower spring; and
    a yoke assembly disposed between the upper spring and the lower spring which are plates arranged in parallel, and selectively vibrates up/down in the housing;
    wherein the yoke assembly has an upper protrusion and a lower protrusion that protrude from a top and a bottom thereof, respectively, the upper protrusion being fastened to a center of the upper spring through the housing, and the lower protrusion being fastened to the center of the lower spring in the housing;
    wherein the yoke assembly includes:
        a lower yoke having a cup shape and opening the top thereof and the lower protrusion formed on the bottom of the lower yoke;
        a magnetic substance fastened to upper surface of the lower yoke; and
        an upper yoke fastened to the top of the magnetic substance and having the upper protrusion on the top thereof;
        an insertion space defined between an inner circumference of the lower yoke and outer circumferences of the upper yoke and the magnetic substance; and
        a coil unit disposed in the insertion space and wound with a coil, wherein an upper portion of the coil unit is fixed to the housing;
    wherein the lower spring and the upper spring each have two or more spokes radially extending from the center, and ends of the spokes are fastened to the housing; and
    wherein the spokes are spirally formed.

2. The active dynamic vibration absorber apparatus for the vehicle according to claim 1, wherein a connection ring connecting the upper yoke with the lower yoke is fitted on the outer circumference of the magnetic substance and a portion of the upper and lower yokes.

* * * * *